Sept. 15, 1925.  1,554,166

E. C. OSGOOD

CORN CUTTING MACHINE

Filed Feb. 25, 1925  2 Sheets-Sheet 1

Inventor
Edward C. Osgood
by Poff & Powers
Attorneys

Sept. 15, 1925.
E. C. OSGOOD
CORN CUTTING MACHINE
Filed Feb. 25, 1925
1,554,166
2 Sheets-Sheet 2
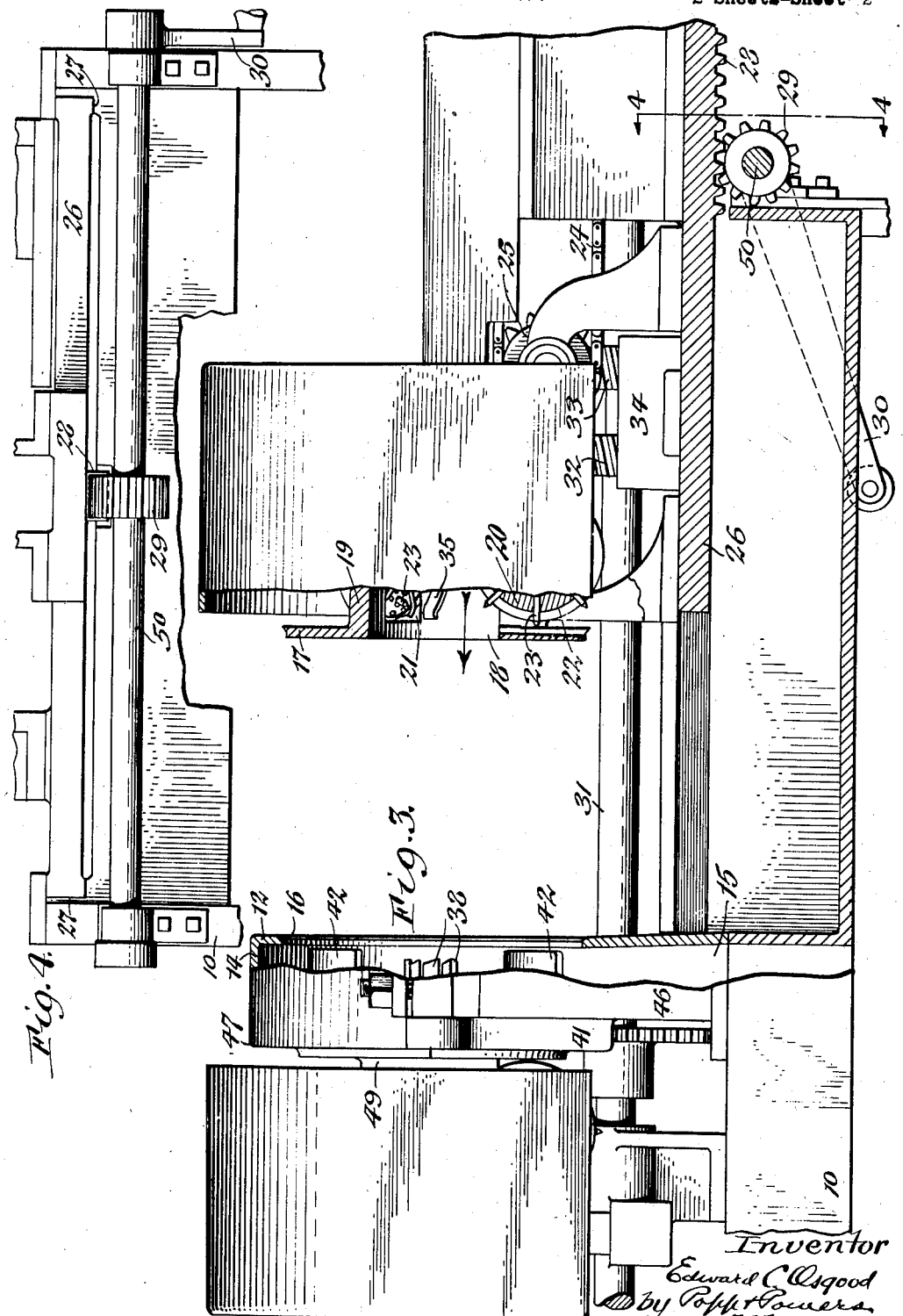
Inventor
Edward C Osgood
by Poff & Powers
Attorneys Patented Sept. 15, 1925.

1,554,166

UNITED STATES PATENT OFFICE.

EDWARD C. OSGOOD, OF ABERDEEN, MARYLAND.

CORN-CUTTING MACHINE.

Application filed February 25, 1925. Serial No. 11,512.

*To all whom it may concern:*

Be it known that I, EDWARD C. OSGOOD, a citizen of the United States, residing at Aberdeen, in the county of Harford and State of Maryland, have invented new and useful Improvements in Corn-Cutting Machines, of which the following is a specification.

This invention relates to a green corn cutting machine of the type in which the kernels or grains are cut from the cob in a practically whole or uncrushed condition instead of in a mushy or crushed condition, such a machine being shown, for example, in Letters Patent of the United States No. 1,408,135 granted to myself February 28, 1922, to which patent reference may be had for a detailed description of such a machine.

In machines of this character it is important to prevent particles removed from the cob and adhering to the machine from accumulating thereon for such a length of time as would be liable to cause fermentation of such particles inasmuch as the mingling of any fermented particles with good kernels going into a can will spoil the entire contents.

It is, therefore, the purpose of this invention to so organize the machine which cuts the whole kernels or grains from the cob of corn that the cutting chamber, which contains the kernel cutting mechanism and from which the material removed from the cobs is discharged preparatory to being canned, may be readily and easily opened so as to render the interior of the cutting chamber and the parts contained therein readily accessible for cleaning and removing therefrom any ears or other obstructions which may be clogging the cutter mechanism and thereby avoiding loss of time in the operation of the machine and increasing the output accordingly.

In the accompanying drawings:—

Figure 3 is a side elevation of the machine, partly in section showing the cutting chamber opened to permit of conveniently cleaning the interior thereof.

Figure 4 is a fragmentary cross section taken on line 4—4, Fig. 3.

Similar characters of reference indicate corresponding parts throughout the several views:—

Figure 1:
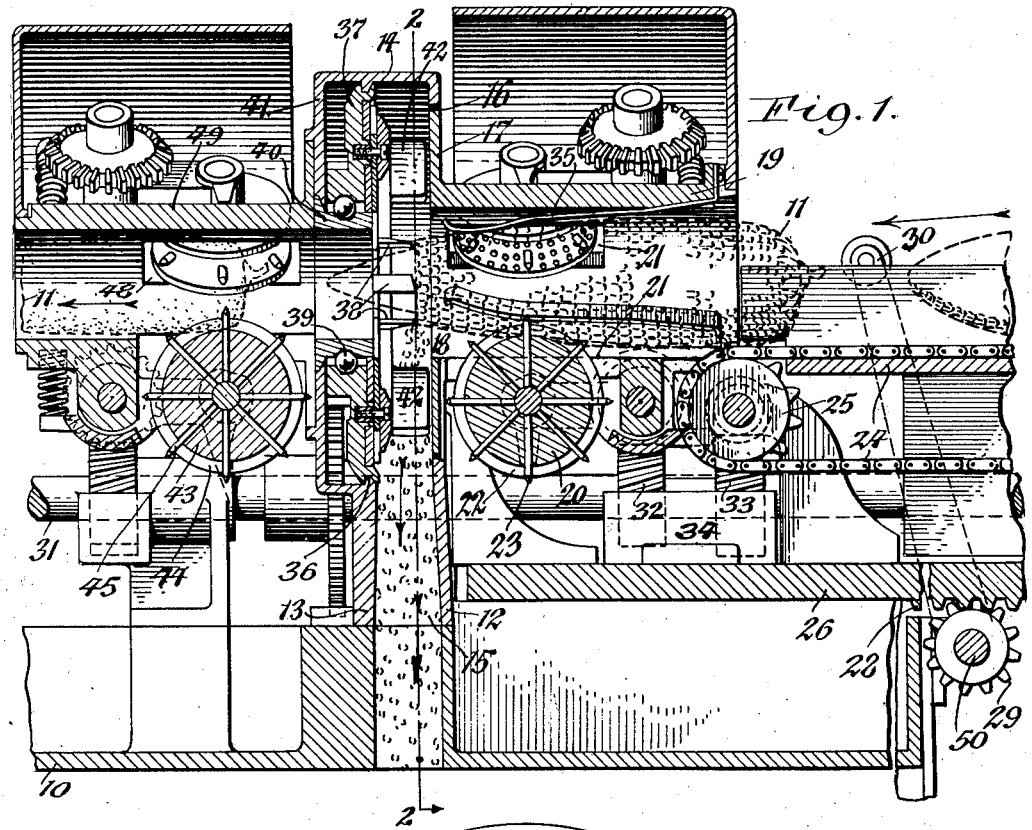
Figure 1 is a fragmentary vertical longitudinal section of a corn cutting machine embodying my improvements and showing the machine closed and in condition for use.

The numeral 10 represents the main frame of the machine which may be of any suitable construction to support the various working parts. Mounted on this frame is a cutting chamber which contains the cutting devices whereby the ears of corn 11 are operated upon for removing the kernels or grains from the cob thereof preparatory to canning the material thus removed. This chamber consists generally of two sections one of which is stationary and the other movable in direction parallel with the length or direction of movement of the ears of corn as they pass through the cutting chamber. In the preferred form of this chamber the stationary section comprises front and rear transverse walls 12, 13 mounted on the main frame, and a peripheral wall 14 connecting the outer edges of the transverse walls and provided on its underside with a downwardly or laterally opening spout or outlet 15 through which the material removed from the corn cobs is discharged from the machine. The front wall is provided with a circular opening 16 in which the longitudinally movable section 17 of this cutting chamber is normally arranged. In its central part this longitudinally movable front wall is provided with an inlet opening 18 for the ears of corn to be cut, said ears being delivered to said inlet by a horizontal longitudinal feed tube 19 mounted at its delivery end on the longitudinally movable cutting chamber section. The ears of corn are fed forwardly through the feed tube and to the cutter mechanism by a feeding mechanism which may be variously constructed but as shown the same is similar to that shown in the Letters Patent referred to and comprises a plurality of feeding wheels 20 arranged in an annular row around the path of the corn and adapted to engage the latter for propelling it through the feeding tube, each of said feeding wheels projecting through a longitudinal slot 21 in said tube and provided with a peripheral groove 22 and teeth 23 in said groove engaging the corn and propelling the same. The feed wheels are yieldably mounted on the feeding tube so as to enable the same to adapt themselves to corn of various diameters and the means for driving the feed wheels are so constructed that these wheels will be driven without interfering with their movement toward and from the axis of the path of the ears of corn. The driving means for the feeding wheels shown in the Letters Patent referred to or its equivalent will answer the purpose. The corn is advanced to the feeding wheel in the present instance by a feed belt or conveyor 24 having its upper operative stretch in horizontal alignment with the lower part of the feed tube and passing with its rear turn around a wheel 25, said belt and wheel being preferably of the sprocket type. The longitudinally movable section of the cutting chamber, and the feeding tube and feeding mechanism associated therewith are mounted on a longitudinally movable slide or carriage 26 which is guided on suitable guideways 27 on the main frame. This slide may be moved lengthwise for causing the longitudinally movable cutting chamber section to either close the opening 16 in the stationary front wall of the cutting chamber, as shown in Fig. 1, or to uncover the same, as shown in Fig. 3, by means of a gear rack 28 arranged on the underside of the slide, a gear pinion 29 meshing with the gear rack, a transverse shaft 50 carrying said pinion and journaled in bearings on the main frame, and a hand crank 30 connected with said shaft. Motion for operating the feeding wheels and feeding belt is derived from a main driving shaft 31 which is journaled lengthwise in suitable bearings on the main frame and motion is transmitted from this shaft to said wheels and belt by means which include spiral gears 32, 33 which are splined on the main shaft 31 but compelled to move lengthwise with the slide 26 by a bracket 34 on the latter, so that the feeding wheels and belt can be moved forwardly in a direction lengthwise of the path of the corn without disturbing the driving connection between the corn feeding means and the driving shaft.

Within the feeding tube are provided a plurality of longitudinal spring centering fingers 35 which serve to hold the corn centrally as it approaches the cutting mechanism.

After entering the cutting chamber the corn passes lengthwise through the same and during this time the corn is operated upon by the cutting mechanism which removes the kernels from the cob and thereafter the cob continues its forward movement and passes through the outlet opening 36 in the rear wall of the cutting chamber and to the means which deliver the cob from the machine while the kernels or grains are discharged downwardly through the lateral outlet 15 of the cutting chamber.

Although the cutting mechanism may be variously constructed, mounted and operated the same preferably is constructed similar to that shown in the Letters Patent referred to, these parts which are here shown comprising an annular rotary carrier 37 arranged in the outlet of the cutting chamber, and a plurality of cutters 38 mounted on the carrier and adapted to rotate circumferentially about the ears of corn and cut the kernels at the base thereof from the cob, the cutters being automatically adapted to the diameter of the corn in the manner described in said Letters Patent. This carrier is mounted by a bearing preferably of the ball type, as shown at 39 on a bearing tube 40 mounted on a rear extension 41 of the cutting chamber.

As the kernels are removed from the cob the same together with any corn silk, corn milk or other materials or particles are discharged through the lateral outlet 15 by blades 42 mounted on the front side of the carrier and acting like the blades of a fan or blower for ejecting the removed material tangentially, radially or laterally from the cutting chamber and also acting as scrapers on the peripheral wall of the cutting chamber by engaging the outer ends of said blades therewith and thus removing any particles which tend to adhere thereto and remove the same through the lateral outlet of the cutting chamber. The cutter may be operated by means similar to those shown in the Letters Patent heretofore mentioned.

As the cobs escape from the outlet of the cutting chamber the same enter a delivery tube 49 which is mounted on the rearward extension of the cutting chamber and is in line with the feeding tube. Projecting radially through longitudinal slots 48 in the delivery tube is an annular row of delivery wheels 43 each of which has a peripheral groove 44 and teeth 45 in said groove for engaging the cob and propelling the same forwardly and discharging the same from the machine. These delivery wheels are yieldably mounted so that they are capable of adapting themselves to cobs of different diameters and they are also driven from the main shaft by means which will not be disturbed by the radial movement of the delivery wheels toward and from the path of the cobs. For this purpose the delivery wheels may be mounted and driven by means similar to those shown in the Letters Patent hereinbefore cited.

If for any reason the cutting chamber becomes clogged, as for example when cutting deformed ears of corn which will sometimes turn from the proper course and become lodged in the cutting chamber, it is then possible to quickly and conveniently open the cutting chamber and remove the obstructive ear or other obstacle and then close the chamber preparatory to resuming normal working of the machine. Owing to the rapidity with which such removal of an obstruction can be effected delay in operating the machine is reduced to a minimum thereby increasing the capacity of the machine accordingly.

Figure 2:
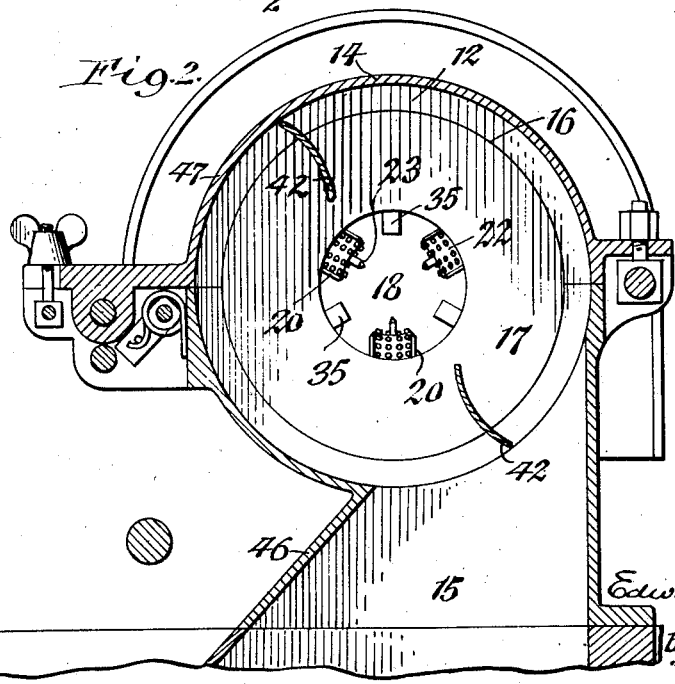
Figure 2 is a cross section taken on line 2—2, Fig. 1.

The cutting chamber is also divided diametrically on a horizontal line to form a lower stationary base 46 and an upper vertically movable cap 47, as shown in Fig. 2, which renders the interior of the cutting chamber accessible for inspection while the same is in operation or for removal of the cutting mechanism.

I claim as my invention:

1. A machine for cutting kernels of green corn from the cob comprising a cutting chamber, having an inlet for the ears of corn, an outlet for the cobs and an outlet for the kernels removed from the cob, said chamber having sections one of which is movable lengthwise relatively to the other in a direction parallel with the path of said ears for opening and closing said chamber.

2. A machine for cutting kernels of green corn from the cob comprising a cutting chamber having a front section provided with an inlet for the corn and a rear section having an outlet for the cob arranged in line with said inlet and a lateral outlet for the material removed from the cob, one of said sections being movable lengthwise relatively to the other stationary section in a direction parallel with the path of the corn and a cutter arranged within the cutting chamber and adapted to remove the kernels from the cob.

3. A machine for cutting kernels of green corn from the cob comprising a cutting chamber having a front section provided with an inlet for the corn and a rear section having an outlet for the cob arranged in line with said inlet and a lateral outlet for the material removed from the cob, one of said sections being movable lengthwise relatively to the other stationary section in a direction parallel with the path of the corn, and a cutter arranged within the cutting chamber and adapted to remove the kernels from the cob and mounted on said stationary section.

4. A machine for cutting kernels of green corn from the cob comprising a cutting chamber having a front section provided with an inlet for the corn and a rear section having an outlet for the cob arranged in line with said inlet and a lateral outlet for the material removed from the cob, one of said sections being movable lengthwise relatively to the other stationary section in a direction parallel with the path of the corn, a cutter arranged within the cutting chamber and adapted to remove the kernels from the cob and mounted on said stationary section, a longitudinally movable slide upon which said movable section is mounted, and a main frame provided with a guideway for said slide.

5. A machine for cutting kernels of green corn from the cob comprising a cutting chamber having a front section provided with an inlet for the corn and a rear section having an outlet for the cob arranged in line with said inlet and a lateral outlet for the material removed from the cob, one of said sections being movable lengthwise relatively to the other stationary section in a direction parallel with the path of the corn, a cutter arranged within the cutting chamber and adapted to remove the kernels from the cob and mounted on said stationary section, a longitudinally movable slide upon which said movable section is mounted, a main frame provided with a guideway for said slide, and means for moving said slide lengthwise comprising a gear rack mounted on said slide, a gear pinion pivotally mounted on said frame and meshing with said rack, and a handle connected with said pinion.

EDWARD C. OSGOOD.